US007705479B2

(12) United States Patent
Spenceley et al.

(10) Patent No.: US 7,705,479 B2
(45) Date of Patent: Apr. 27, 2010

(54) STIRLING ENGINE INSTABILITY DETECTION AND PREVENTION

(75) Inventors: Christopher John Spenceley, Yattendon (GB); Roger Stuart Silcock, Peterborough (GB); Wayne Kenneth Aldridge, Granby (GB); Jarlath Michael McEntee, Castine, ME (US); Stephen Charles Welty, Cambridge (GB); Gordon Smith, Runcorn (GB); Christopher Mark Hardingham, Danbury (GB)

(73) Assignee: Microgen Engine Corporation Holding B.V., ULFT (NL)

( * ) Notice: Subject to any disclaimer, the term of this patent is extended or adjusted under 35 U.S.C. 154(b) by 477 days.

(21) Appl. No.: 11/658,049

(22) PCT Filed: Jul. 22, 2005

(86) PCT No.: PCT/GB2005/002877

§ 371 (c)(1),
(2), (4) Date: Jan. 22, 2007

(87) PCT Pub. No.: WO2006/008540

PCT Pub. Date: Jan. 26, 2006

(65) Prior Publication Data

US 2008/0296896 A1 Dec. 4, 2008

(51) Int. Cl.
*F01K 15/00* (2006.01)
*F01B 29/10* (2006.01)
(52) U.S. Cl. .................. 290/2; 60/518; 60/524
(58) Field of Classification Search .......... 290/2, 290/1 A, 51, 40 R; 123/2, 3; 60/618, 518, 60/524, 516, 520; 322/33, 44
See application file for complete search history.

(56) References Cited

U.S. PATENT DOCUMENTS 3,100,284 A * 8/1963 Kerns .................... 331/55
4,490,841 A * 12/1984 Chaplin et al. .......... 381/71.14

(Continued)

FOREIGN PATENT DOCUMENTS

EP   0 239 806   10/1987

(Continued)

OTHER PUBLICATIONS

Proceeding of the International Society of Energy Conversion Engineering Conference, vol. 3, Aug. 19, 1984 San Francisco, CA, USA (Abstract).

*Primary Examiner*—Julio Gonzalez
(74) *Attorney, Agent, or Firm*—Ballard Spahr LLP

(57) ABSTRACT

A Stirling engine (1) includes a reciprocating piston which drives an alternator to provide an electrical output (7). The current signal (7) is measured by a current monitor (60) and a fast Fourier Transform value is produced. The FFT of the current signal (7) has been found to be directly related to the stability of operation of the Stirling engine. As harmonic peaks in the FFT increase, this indicates that the stroke length of the piston is approaching or exceeding a safe maximum. Correction action, such as a reduction in heat to the Stirling engine, can be taken in consequence. A variety of stroke length detectors (110) are also disclosed, for use in combination with, or separately from, the FFT analysis of the current signal (7). Optical and mechanical switches and analogue sensors are disclosed, along with an accelerometer mounted upon the casing of the Stirling engine.

24 Claims, 5 Drawing Sheets

U.S. PATENT DOCUMENTS

| | | | |
|---|---|---|---|
| 4,733,340 A * | 3/1988 | Mase et al. | 363/35 |
| 5,502,968 A | 4/1996 | Beale et al. | 62/6 |
| 5,559,421 A * | 9/1996 | Miyakawa | 322/58 |
| 6,225,790 B1 | 5/2001 | Harmon | 322/28 |
| 6,536,326 B2 | 3/2003 | Unger et al. | 91/361 |
| 2004/0012203 A1 | 1/2004 | Schlangen et al. | 290/31 |
| 2005/0052029 A1 * | 3/2005 | Aldridge et al. | 290/2 |
| 2009/0010100 A1 * | 1/2009 | Howard | 367/13 |

FOREIGN PATENT DOCUMENTS

| | | |
|---|---|---|
| JP | 2003172154 | 6/2003 |
| WO | WO 03/076857 A2 * | 9/2003 |
| WO | WO 03/084023 A1 * | 10/2003 |
| WO | WO 2004/094860 | 11/2004 |

* cited by examiner

STIRLING ENGINE INSTABILITY DETECTION AND PREVENTION

CROSS REFERENCE TO RELATED APPLICATIONS

The present application claims priority to Great Britain Patent Application No. 0416330.9 filed Jul. 22, 2004, which application is incorporated herein fully by this reference.

FIELD OF THE INVENTION

This invention relates to a method and an apparatus for detecting instabilities in a domestic combined heat and power unit (dchp) and particularly but not exclusively to a method and apparatus for detecting and/or preventing piston overstroke in a linear-free piston Stirling engine in a dchp unit.

BACKGROUND OF THE INVENTION

Linear-free piston Stirling engines (LFPSEs) may be employed to generate both heat and power for domestic use. The basic manner of operation of a dchp system incorporating such an LFPSE is detailed in various of our earlier published patent applications—see for example WO-A-03/076857.

LFPSEs typically comprise a displacer mounted via a flexible rod to displacer springs. Application of heat to the space above causes the displacer to reciprocate. A power piston is mounted coaxially and radially outwardly of the displacer flexible rod and reciprocates as well due to the gas forces acting between the displacer and power piston. Power output results from a linear alternator which comprises magnets mounted for movement with the power piston, relative to fixed windings.

It is highly undesirable (and potentially damaging) for moving parts of the LFPSE to come into contact with stationary, or other moving parts as a result of piston overstroke. Repeated collision of moving parts with stationary, or other moving parts will over time cause wear to the components, and apart from reducing the life of the engine, this process also results in small particles (arising from the collision wear) interfering with the narrow internal flow passageways of the engine.

In order to maximize the efficient use of energy input to the engine, it is usual to allow the LFPSE to operate at its mechanical resonant frequency. As a consequence, because the piston stroke is unconfined, the amplitude of reciprocation varies as a function of operating conditions and piston overstroke can occur. Various schemes have been proposed to address the problem of engine instability due, for example, to such piston overstroke. These schemes can broadly be categorised as detection and prevention.

Prevention techniques typically involve the use of magnets of opposing polarity to those in the alternator, to provide centering forces if the power piston starts to move outside of a safe range of movement. One such arrangement is described, for example, in U.S. Pat. No. 4,937,481. This technique suffers from the drawback that the magnet strength may reduce over time, reducing the effectiveness of the magnets as "stops".

Detection techniques monitor engine parameters and usually provide for a rapid shutdown when it is determined that an instability such as piston overstroke is present or imminent. For example, it is known to employ vibration absorber proximity detectors with trip switches, as a safety-critical component. Piston overstroke is detected through determination of the relationship between the amplitude of reciprocation of the absorber mass and the piston stroke length.

In WO-A-2004/094860, an external mechanical or optical "on/off" switch is mounted on the vibration absorber of a Stirling engine, to ascertain when the amplitude of oscillation of the absorber (which is linked to the stroke length of the piston) exceeds a preset maximum. Upon detection of an overstroke condition, the heat to the Stirling engine is reduced to reduce, in turn, the piston stroke length.

In an alternative arrangement, as disclosed in JP-A-2003014322 (Sharp Corporation), an anti-collision mechanism for a Stirling refrigeration machine has a linear motor and the stroke of this is measured by determining the voltage and current applied to it. U.S. Pat. No. 5,836,165 (Hughes Electronics) suggests an arrangement which controls vibrations in a Stirling refrigeration machine by carrying out a Fourier analysis of the output signal of a vibration sensor.

Still a further scheme is disclosed in U.S. Pat. No. 6,536,326 (SunPower), wherein an acoustic measurement of the vibration is carried out using a microphone mounted upon the casing of the engine. The microphone output is used for feedback control of the piston in an LFPSE so as to back off piston amplitude when piston collision is detected. It will be understood from the foregoing that there are competing requirements on the engine in that, in many cases, it is desirable to run the engine at its maximum stroke (for maximum power output), but that at that maximum stroke, the possibility of overstroke is at its highest. As such, accurately predicting and/or detecting instability through piston overstroke is highly desirable. If engine shut-down is mandated upon detection of an overstroke, then false positives result in unnecessary engine shutdowns. These are at best an irritation (since shutdown stops any heat or power output). It is also necessary to wait for a significant period before restarting, whilst the engine burner cools below a threshold temperature, so as to avoid burner pre-ignition. Thus, unnecessary engine shutdowns are also time-consuming. False negatives are of course even more unacceptable since failure to prevent piston overstroke (through engine shutdown for example) can cause engine damage over time.

It is an object of the present invention to provide for improved techniques to address the problems of detection and/or prevention of engine instability.

SUMMARY OF THE INVENTION

Against this background and in accordance with a first aspect of the present invention there is provided an instability detection apparatus for detecting instabilities within an engine of a domestic combined heat and power unit, the dchp unit having a combustible fuel supply and a generator for producing an electrical power output, the apparatus being arranged to receive a signal from the generator of the dchp unit, to carry out a Fourier Transform on that signal, and to monitor the Fourier Transform so as to identify the presence of artefacts within the Fourier Transform which are indicative of existing or developing instabilities within the dchp engine.

By monitoring artefacts within a Fourier Transform of the signal from the dchp generator, such as, for example, a fast Fourier Transform (FFT) of the current signal from the alternator as it is fed to a mains grid interface/domestic circuitry, the stability of operation of an engine in the dchp unit can be monitored. If instabilities are detected in that engine (e.g. components such as the piston and cylinder ends/displacer becoming undesirably close and gas spring forces coming into play between them), corrective action can be taken, such as reducing the engine burner firing rate, before full-blown overstroke occurs, and thus preventing damage.

In a second aspect of the present invention, there is provided a dchp system which has a dchp unit having a combustible fuel supply, a generator for producing an electrical power output and a heat output, and such an instability detection apparatus.

In accordance with a further aspect of the present invention there is provided a method of detecting instabilities within an engine of a domestic combined heat and power unit, the dchp unit having a combustible fuel supply, being capable of generating a heat output, and having a generator for producing an electrical power output, the method comprising receiving a signal from the generator of the dchp unit; carrying out a Fourier Transform on that signal; and monitoring the Fourier Transform so as to identify the presence of artefacts within the Fourier Transform which are indicative of existing or developing instabilities in the dchp engine.

In accordance with a further aspect of the present invention there is provided a stroke length detector for determining the stroke length of a reciprocating member in an engine of a domestic combined heat and power unit, the stroke length detector comprising a vibration detector for detecting a vibration level of the dchp engine; and a processor for receiving a signal from the vibration detector indicative of the detected vibration level, the processor being configured to provide a stroke length detector output representative of the stroke length of the reciprocating member.

The casing vibration has been determined to be a factor of both the stroke length of the reciprocating member and of the frequency of reciprocation of the components within the engine (which will include but will not necessarily be limited to the reciprocating member). When connected to the grid, the vibrational frequency can vary between about 47 and 50.5 Hz, as a consequence of fluctuations in the prevailing grid frequency. When operating in so-called grid independent mode, the alternator that is connected to the Stirling engine provides up to 16 A of current at around 240V and a nominal 50 Hz. However, the nominal operating frequency may vary by several Hz in that case, or more.

When the nominal and actual operating frequencies are the same or similar, the vibration sensor output may provide a good indication of piston stroke length by itself. For larger variations between the rated (nominal) and actual frequencies, a correction factor, determined for example by the use of a prestored/predetermined look-up table, may be needed to obtain an accurate estimate of piston position.

By adjusting the frequency in real time as the mains frequency varies, a frequency-corrected measure of casing acceleration for example, (where the vibration detector is the preferred embodiment of an accelerometer) can be obtained.

The measurement of casing acceleration (frequency corrected where necessary) has been found to give a reliable indication of the piston stroke length inside the engine. This in turn allows the derivation of a fully reliable confirmation of impending overstroke.

The technique of aspects of the invention, for determining the onset of instability (by monitoring a Fourier Transform of the generator output signal) can be usefully combined with the technique of other aspects of the invention, for accurately determining stroke length (by optical or mechanical determination of stroke length). In particular, the combination of these techniques provides for a robust, powerful two stage system that allows for early detection of impending unstable operation of a dchp engine, such as a Linear Free Piston Stirling Engine, and rapid engine shut down where deemed necessary, but with fewer false positives leading to unnecessary engine shutdowns, and fewer false negatives leading to potential engine damage. Thus, in accordance with still a further aspect of the present invention there is provided a dchp system comprising a dchp unit having an engine with a reciprocating member; a combustible fuel supply; a heat output; and a generator for generating an electrical power output; the dchp unit being connected to a mains power supply but operable in the absence thereof; an instability detection apparatus as defined in earlier aspects of this invention; a stroke length detector; and a system controller arranged to receive as a first input from the instability detection apparatus, an indication of the presence of artefacts in the Fourier Transform of the generator output, to receive as a second input from the stroke length indicator the said stroke length detection output; and to control the dchp unit so as to reduce the stroke length of the reciprocating member in dependence upon the first input thereto, the second input thereto, or both.

In still a further aspect of the present invention there is provided a method of controlling an engine in a dchp unit so as to reduce or prevent instabilities in the engine, comprising the steps of detecting instabilities in the engine using the method of other aspects of this invention; determining the stroke length of a reciprocating member within the engine; and controlling the engine when instabilities are detected, the determined stroke length exceeds a predetermined threshold length, or both.

In accordance with still a further aspect of the invention, there is provided a stroke length detector for determining the stroke length of a reciprocating member in an engine of a domestic combined heat and power unit, the detector comprising a first part mounted for movement with the reciprocating member; a second part mounted so as to be stationary relative to the first part; and an output arranged to indicate stroke length; the first and second parts being arranged so as mutually to co-operate with one another over only a part of a cycle of the reciprocating member, the output being obtained based upon the duration or extent of co-operation for a particular cycle of the reciprocating member. Preferably, in that case, the detector further includes an integrator to integrate the time over which the two parts co-operate in a given cycle of the reciprocating member so as to produce a detector output based upon their integrated time and representative of stroke length.

BRIEF DESCRIPTION OF THE DRAWINGS

Embodiments of the present invention will now be described by way of example only and with reference to the accompanying drawings in which.

DETAILED DESCRIPTION OF THE PREFERRED EMBODIMENT

Figure 1:
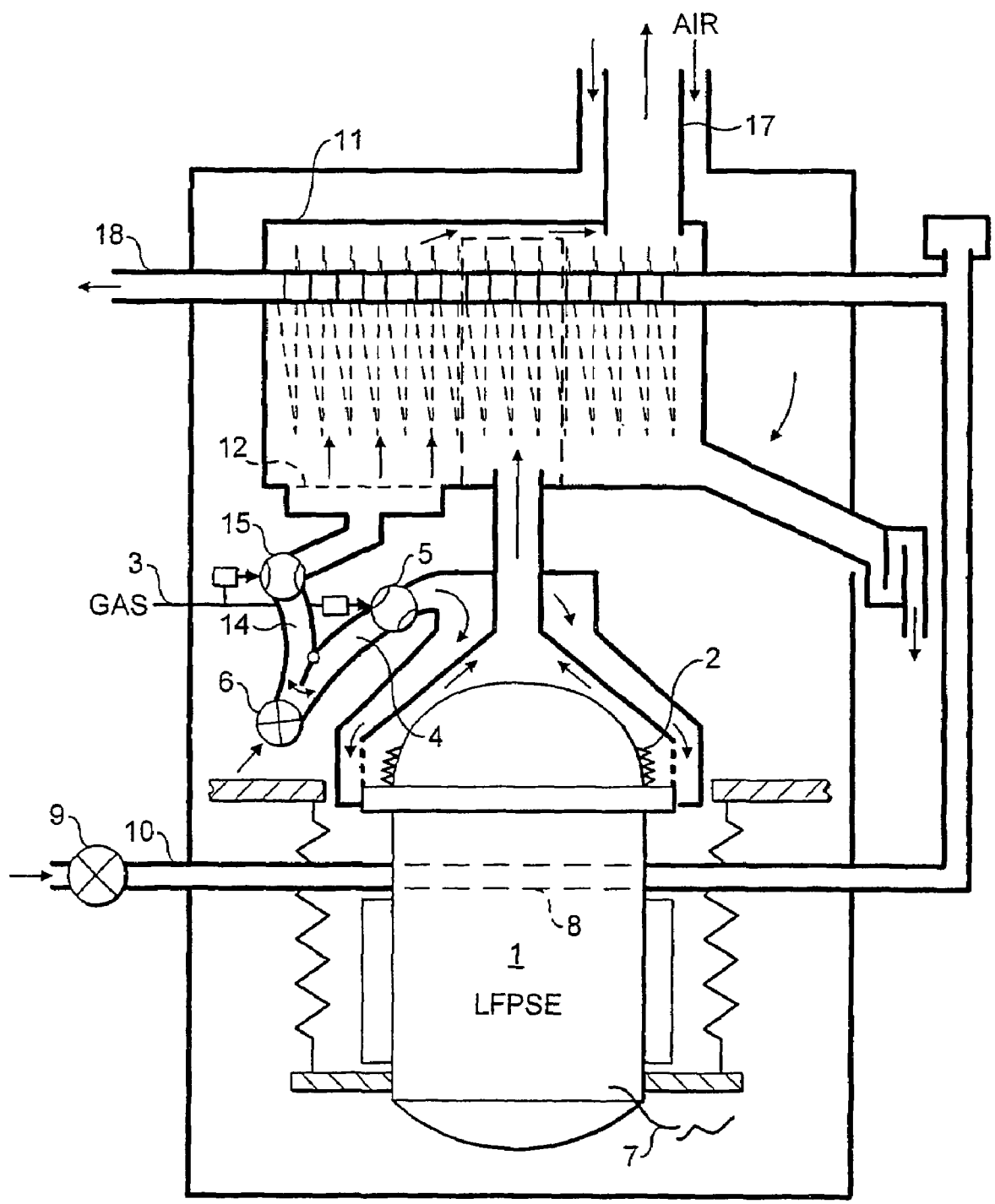
FIG. 1 is a schematic view of a Stirling engine system showing the various inputs and outputs to the system.

The dchp system is based around a Stirling engine 1 as shown in FIG. 1. The engine is preferably a linear free piston Stirling engine the operation of which is well known in the art. For use in a dchp system, the electrical output of the engine should be a single phase output of up to 16 A.

The Stirling engine 1 is driven by a heat input from engine burner 2. This burner is fuelled by combustible gas supply 3 which is mixed with an air supply 4 under the control of a valve 5. The mixed stream is fed to the burner 2 by a fan 6. This drives the Stirling engine in a manner well known in the art to generate an electrical output 7 from a linear alternator. Heat is extracted from the Stirling engine at cooler 8 which is essentially a heat exchanger through which water is pumped by a pump 9 along line 10. The water passing through the cooler 8 is then further heated in a heat exchanger 11 by exhaust gas from the engine burner which has heated the head of the Stirling engine. In order to provide further heating of the water, and to provide a degree of independence to heat the water when the Stirling engine is not being operated, a supplementary burner 12 is provided to heat the water in the heat exchanger 11. The supplementary burner is fuelled by the combustible gas supply 3 which is mixed with an air supply 14 under the control of a valve 15. The mixed stream is fed to the supplementary burner 12 by the fan 6.

The fan 6 feeds air to mixer valves 5 and 15 through a diverter valve (not shown) which ensures the correct air flow to each mixer. In an alternative design, separate fans have been used to feed air to the two gas/air mixer valves 5, 15.

Exhaust gases from the engine burner 2 and supplementary burner 12 which have given up their heat in the heat exchanger 11 then exit along flue 17. In this manner, the Stirling engine 1 produces an electrical output 7 and a heat output 18 which may be used, for example, to provide the domestic hot water requirement, or to feed a central heating system, or both of these in a combination arrangement (a Combi® boiler).

The proposed dchp system is designed to provide up to 1 kW of electricity (net), feeding directly into the domestic network, and hence combining with the supply from the mains grid to which the alternator of the Stirling engine 1 is connected.

Figure 2:
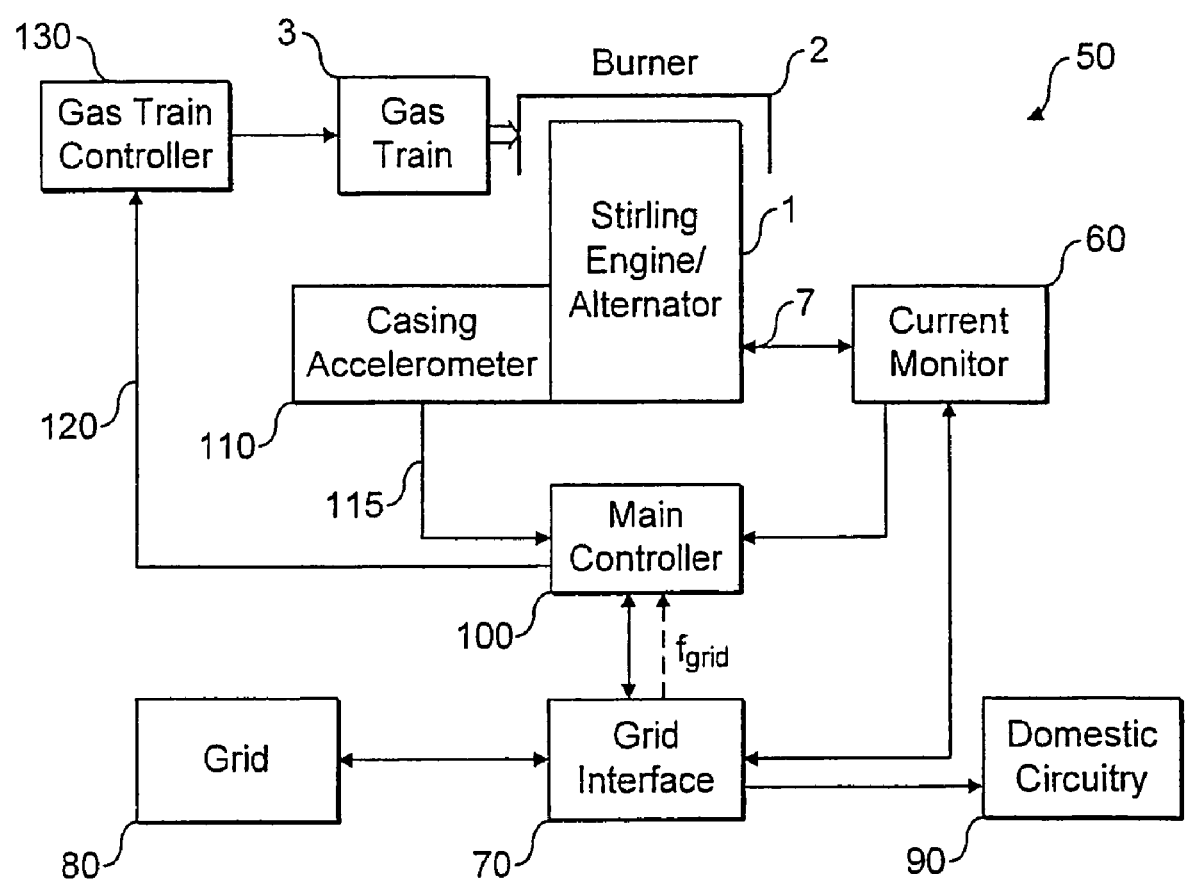
FIG. 2 is a schematic diagram of an instability detection and correction system for the Stirling engine of FIG. 1.

FIG. 2 shows a highly schematic diagram illustrating an engine instability detection and correction system 50 embodying the present invention. Features common to FIGS. 1 and 2 have been labelled with like reference numerals.

In FIG. 2, the electrical output of the alternator that forms a part of the Stirling engine 1 is connected via a current monitor 60 to a grid interface 70 which acts as a bridge between a mains power supply (the grid) 80 and the dchp. As is described in our earlier application WO-A-03/076857, referenced above, the grid interface is also connected to the domestic circuitry in a house and allows, for example, operation of certain sockets in the household under emergency conditions when the connection to the grid 80 does not exist as a result of a power cut.

Mounted on a part of the Stirling engine or housing is an optical or mechanical sensor 110 which, depending upon the specific nature of the sensor 110, produces a sensor output indicative of piston stroke length. In some embodiments, to be described below, the sensor is of the "on/off" type which thus provides a single indication of whether the piston stroke length is within acceptable limits or not. Other embodiments provide a variable (quantitative) output, such as an analogue signal, indicative of the stroke length of each stroke (or, at least, a quantity of strokes). Schematically, the sensor 110 is shown in FIG. 2 mounted upon the dchp casing but, as will be understood from the following, depending upon the nature and purpose of the sensor 110, other suitable locations may be chosen.

The sensor 110 and the current monitor 60 are each connected to a system controller 100. The system controller takes outputs from the sensor 110 and the current monitor 60 and processes them in a manner to be described below, so as to monitor instabilities in the engine 1 and in particular overstroke of a piston (not shown) and/or other moving parts which may damage the internal parts of the engine. As a consequence of any detected instabilities, the controller is able to back off the firing rate of the burner 2 by sending a signal along line 120 to a gas train controller 130 which in turn controls the gas train 3. When severe instabilities are detected (or the rate of increase of the instabilities exceeds a certain level), the controller 100 is capable of shutting down the Stirling engine 1 completely, by stopping the supply of gas to the burner, or even applying an emergency brake to the Stirling engine by switching a stop resistor across the alternator circuit thereof.

It is to be appreciated that the blocks in FIG. 2 show the control functionality, but these may in many instances be separate or combined (e.g. the controller 100 and the gas train controller 130 could be part of the same unit). For clarity the functions are shown as separate.

Having provided an overview of the system connections, a detailed description of the separate detection/monitoring functions carried out by the controller 100 will now be described.

Early Instability Warnings:

By monitoring the current signal 7 from the alternator, as it is fed to the grid interface 70/domestic circuitry 90, the stability of engine operation can be monitored. If instabilities are detected (e.g. components such as the piston and cylinder ends/displacer becoming undesirably close and gas spring forces coming into play between them), corrective action can be taken, such as reducing the firing rate of the engine burner 2, before full-blown overstroke occurs, and thus preventing damage.

Figure 3A:
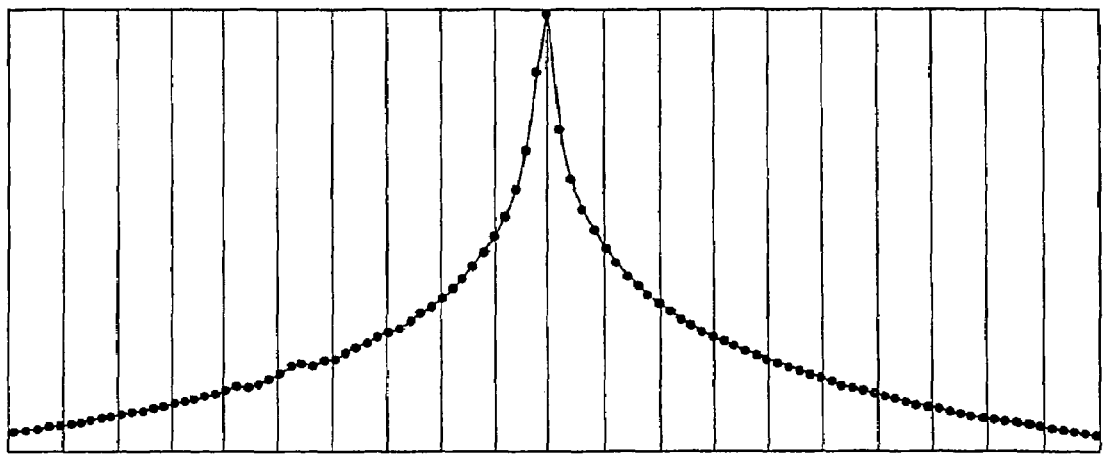
FIG. 3a shows a Fast Fourier Transform (FFT) of a current output from the Stirling engine of FIGS. 1 and 2, under stable operating conditions.
Figure 3B:
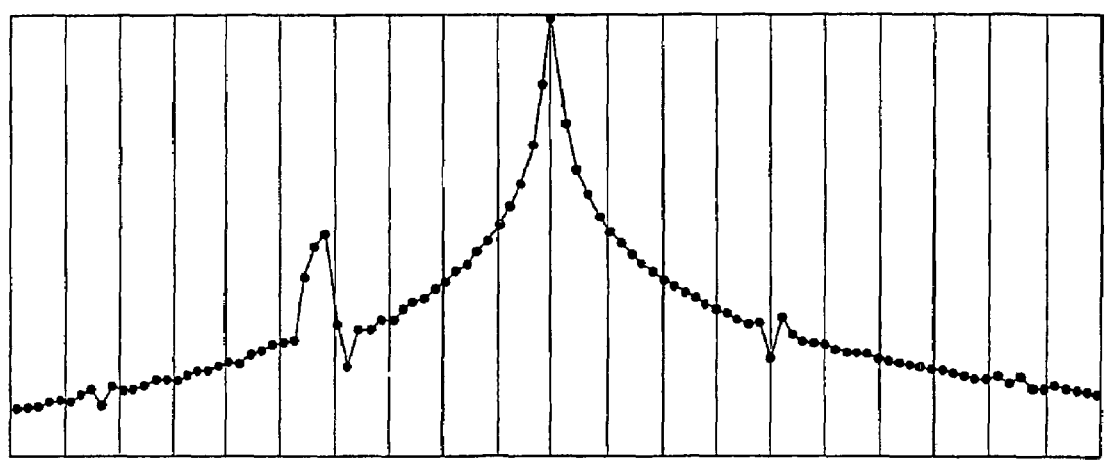
FIG. 3b shows a Fast Fourier Transform (FFT) of a current output from the Stirling engine of FIGS. 1 and 2, under unstable operating conditions.

To do this, the current signal 7 measured by the current monitor 60 is modified to produce an FFT (Fast Fourier Transform) value. This has been found to be directly related to the stability of operation of the engine. FIGS. 3a and 3b show the difference between a stable and unstable FFT plot of the current signal 7. Where non-resonant, harmonic frequency peaks are detected this indicates developing instabilities, giving a warning that internal engine clearances are reducing. As the harmonic peaks increase in both magnitude and number this indicates the need to consider corrective action and access additional information about the stroke length inside the engine.

Stroke Length Confirmation:

Various embodiments of stroke length confirmation arrangements are contemplated and will now be described with reference particularly to FIGS. 4, 5, 6 and 7. The arrangements fall into two general types, an "on/off" switch that simply identifies whether or not the piston exceeds a predetermined stroke, and an "analogue" type arrangement that generates a continuous or repeated output indicative of piston position throughout at least a portion of the stroke.

Figure 4:
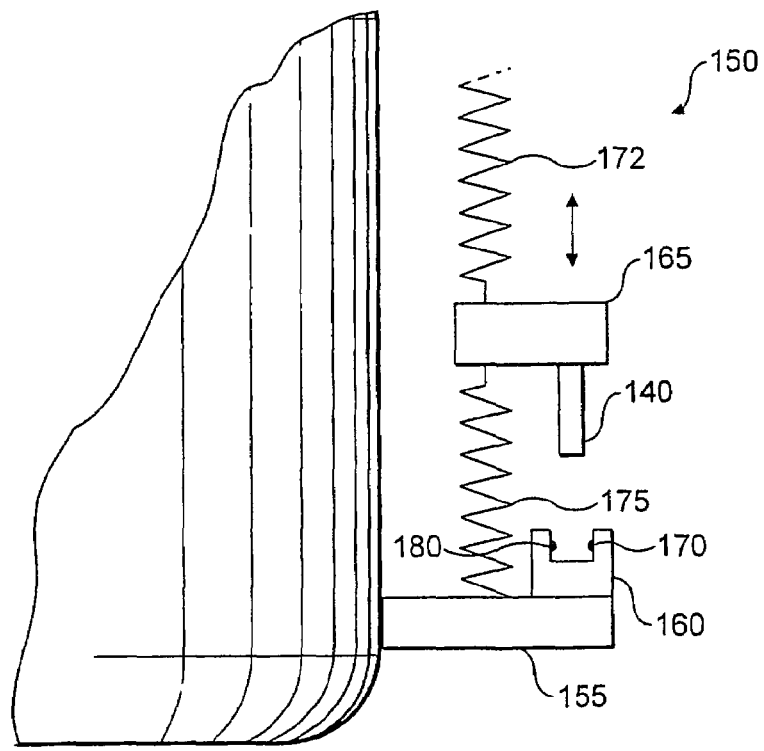
FIG. 4 shows a schematic section of a piton overstroke detector embodying a preferred feature of the present invention and including a part of a Stirling engine.

Turning first to FIG. 4, a highly schematic overstroke detector arrangement is shown. The arrangement includes an optical sensor 150, mounted upon a lower mounting plate 155 of a vibration absorber arrangement that is attached to the casing of the Stirling engine 1, only a part of which is shown in FIG. 4

Figure 5:
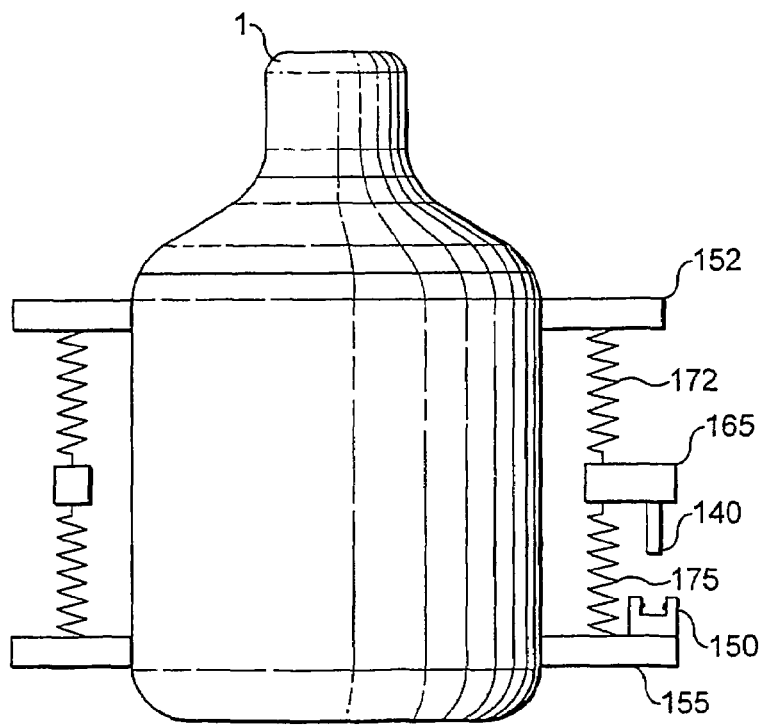
FIG. 5 shows a Stirling engine schematically, to illustrate the location of the piston overstroke detector of FIG. 4.

As best seen in FIG. 5, the vibration absorber arrangement includes upper and lower mounting plates 152,155. An absorber mass 165 is suspended from the upper mounting plate 152 of the vibration absorber by a first spring 172 and supported from the lower mounting plate 155 by a second spring 175. The absorber mass 165 moves as the piston of the Stirling engine reciprocates, whereas the upper and lower mounting plates 152, 155 are generally stationary relative to the piston. Thus the movement of the absorber mass 165 can be linked to the movement (and in particular the position) of the piston in use.

Referring still to FIG. 4, a blade 140 is mounted on the absorber mass 165. The blade 140 reciprocates in a direction parallel with the direction of reciprocation of the piston in the Stirling engine 1, within the air gap between the absorber mass 165 and the optical sensor 150. The direction of reciprocation is shown by the arrow in FIG. 4.

The optical sensor 150 comprises a cup-shaped housing 160 with an optical transmitter 170 and an optical receiver 180 mounted or affixed within or to the internal walls of the cup-shaped housing 160. A light beam passes from the transmitter 170 to the receiver 180.

In use, the blade 140 reciprocates in the direction of the arrow, so as to intersect the light beam that passes between the optical transmitter 170 and optical receiver 180 within the optical sensor 150, under specific operating conditions.

In a simplest embodiment, the blade 140 and sensor 150 are configured to act as an "on/off" switch for overstroke detection and prevention. As explained above, it is desirable for the engine to operate with as great an amplitude as possible, in order to give the maximum generated power. This must be, however, achieved without exceeding acceptable limits, where there is a risk of noisy and/or potentially damaging internal collisions. During optical operation, in this simplest embodiment of an overstroke detector, the blade 140 is arranged to extend into the sensor 150 such that, when the engine is reciprocating at its maximum safe amplitude, the beam of light between the transmitter 170 and receiver 180 is just not cut by the tip of the blade 140. Thus, as soon as this maximum amplitude is exceeded, the tip of the blade 140 will cut the light beam. As soon as the cutting of the light beam is detected, the controller 100 (FIG. 2) can adjust the burner or otherwise limit the stroke length of the piston of the Stirling engine 1.

Although an optical "on/off" switch has been described, the skilled reader will, nevertheless, appreciate that similar mechanical switches could be employed, where, for example, the blade 140 touches or presses a mechanical switch at overstroke. The problem with such an arrangement, however, is that it can destroy the mechanical switch when an overstroke condition does occur. This in turn can result in the need to partially dismantle the dchp in order to replace the switch. The optical switch of FIG. 4, by contrast, can be arranged to avoid this particular problem, since, provided the transmitter 170 and receiver 180 are arranged sufficiently above the base of the cup-shaped housing 160, the blade 140 will cut the light beam and trigger a backoff of the burner temperature or an emergency shut-down without mechanical contact of moving parts of the switch.

In a second, alternative embodiment, instead of a simple two-state (on/off) switch, the optical sensor 150 can instead be used to provide an analogue output. This can in turn be monitored by the controller 100 (FIG. 2) to maintain the amplitude of reciprocation of the piston as great as possible, but without exceeding the acceptable limits where potentially damaging and/or noisy behaviour might arise.

In this alternative embodiment, the controller is connected directly or indirectly (for example, through a digital-to-analogue converter) to the output of the optical receiver 180. The blade 140 is of an appropriate length such that, when the amplitude of reciprocation of the piston within the engine approaches the limits of acceptable operation, so that a risk of internal collisions arises, the blade 140 starts to intersect the light beam between the optical transmitter 170 and optical receiver 180. As the amplitude of reciprocation increases, the blade then intersects the light beam for a greater proportion of each cycle (that is, the optical receiver 180 receives no light beam from the optical transmitter 170 for a longer time span). By using an integral timing circuit, the interruption period per cycle may be measured. The optical sensor 150 can then send a signal to the engine controller 100 indicating the current interrupt period, so that the controller is aware when critical amplitudes are reached and can initiate corrective action as described previously. The parameters of operation (that is, the proportion, for example, of the allowed maximum reciprocation amplitude at which the blade 140 starts to intersect the light beam, the length of light beam obstruction that the controller decides represents an overstroke condition) can be pre-set by a user. It will also be appreciated that the optical sensor, operating in this mode, can act to provide a feedback signal to the controller to indicate when reciprocation is back within acceptable limits, when the controller has acted to reduce the amplitude of reciprocation of the piston within the engine, by adjusting the heat input to the engine.

Figure 6:
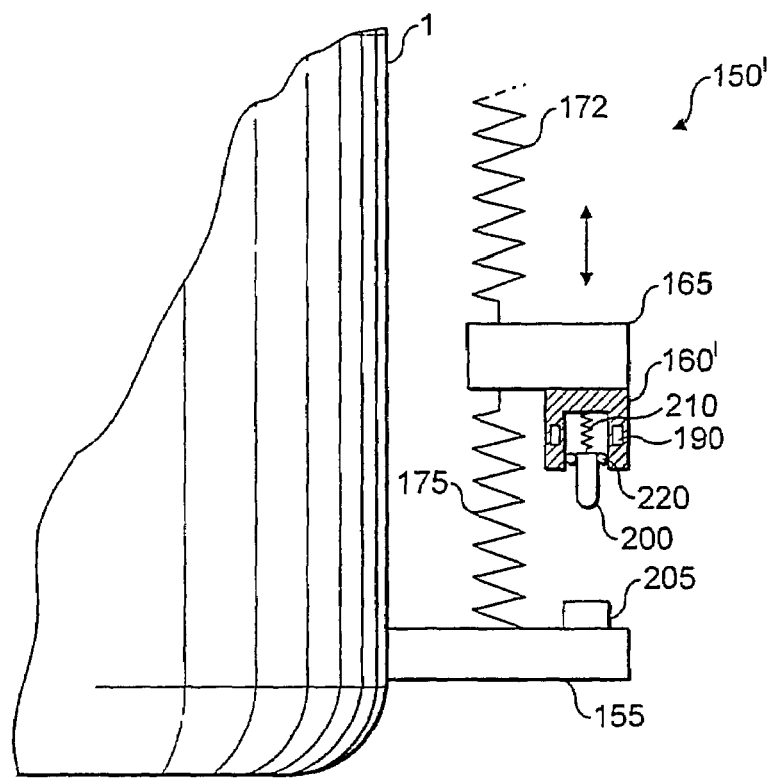
FIG. 6 shows a schematic section of a piston overstroke detector which is an alternative embodiment of a preferred feature of the present invention.
Figure 7:
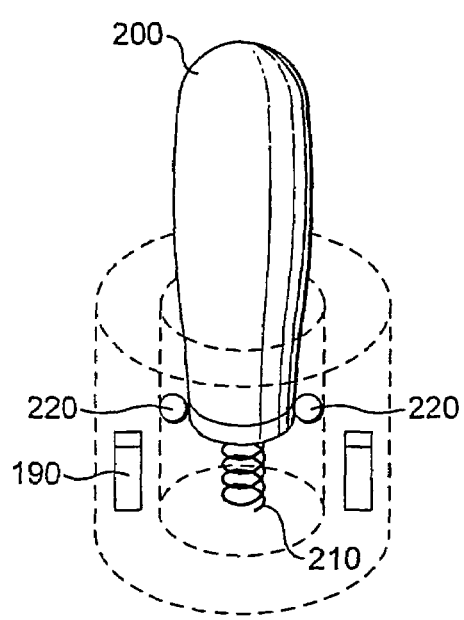
FIG. 7 shows the detector of FIG. 6, as a third angle projection.

FIGS. 6 and 7 show still a further alternative embodiment of sensor 150' which is based upon a progressive mechanical switch similar to, for example, the type of switch used in a domestic refrigerator to operate the light when the door is opened. The sensor 150' comprises a housing 160' which contains an annular, generally electrically conductive contact 190 that is formed within a recess inside the housing 160'. The sensor 150' is affixed to the absorber mass 165 as shown in FIG. 6. A plunger 200 of the sensor 150' is spring-biased away from the base of the cup-shaped housing 160' thereof, by means of a helical spring 210. The plunger faces towards a switch 205 affixed to the lower mounting plate 155 of the vibration absorber.

The plunger 200 has an outer diameter slightly less than the inner diameter of the cup-shaped housing 160 but is held radially in place by an electrically conductive annular spacer 220.

In use, depression of the plunger 200 causes the plunger to slide within the bore of the cup-shaped housing 160', and the annular spacer 220 travels with the plunger 200 in the direction shown by the arrow in FIG. 6. Contact between the annular spacer 220 and the annular contact 190 results in an electrical signal being sent to the controller 100 (FIG. 2).

By analogy with the second embodiment described above in connection with FIGS. 4 and 5, where a time-based signal is generated depending upon the length of time that the light beam is cut, in the arrangement of FIGS. 6 and 7 the controller receives a signal proportional to the period of depression of the plunger when it is depressed by contact with the lower engine casing. More particularly, the controller 100 receives a signal proportional to the amount of time during which the annular spacer 220 is in contact with the annular contact 190, and, as the piston amplitude increases, the plunger is depressed further on each cycle and for a longer period, so that the time of contact between the contact 190 and spacer 220 increases. This in turn indicates to the controller that critical amplitudes are being reached and corrective action is required as explained previously.

Although a pressure rather than time-based mechanical switch could be used, the benefit of the time-based arrangement of FIGS. 6 and 7 is that it is less likely to result in destruction of the switch itself.

Still a further advantage of the optical switch over the mechanical switch is that the former may be operated in fail-safe mode. Should the optical switch fail and no light beam be present, the controller will not allow the engine to operate, since it will receive a signal from the sensor 150 of FIG. 4 that indicates maximum overstroke (equivalent to obstruction of the light beam for the full cycle). On failure of the mechanical switch of FIGS. 6 and 7, by contrast, the signal sent to the controller would indicate that no contact between the annular contact 190 and annular spacer 220 was being experienced, such that no problems would be detected. An alternative failure strategy would therefore be required in the embodiment of FIGS. 6 and 7.

Of course, it would be equally possible to mount the sensor 150 of FIG. 4 on the absorber mass 165, with the blade 140 mounted upon the lower mounting plate 155. Equally, it does not matter whether the upper or lower mounting plate of the vibration absorber is used as the relatively fixed reference— indeed any other suitable point on or adjacent to the dchp unit could be employed. Similar considerations apply to the sensor 150' of FIGS. 6 and 7.

In still a further embodiment of a stroke length confirmation arrangement, the sensor 110 is an accelerometer with a linked switch (not shown in FIG. 2). This is attached to the casing of the Stirling engine 1, and monitors the vibration levels (casing acceleration). The output signal 115 from the accelerometer that constitutes the sensor 110 in this embodiment is fed to the controller 100 which may apply a frequency correction derived from the frequency of the grid, as sampled by the grid interface 70. The correction may be necessary as the casing vibration is a factor of both the stroke length and of the frequency of reciprocation of the components within the engine, which can vary. When the dchp is connected to the mains electricity supply, the variation in frequency of reciprocation of engine components (in the UK) is typically between about 47 and 50.5 Hz depending on the prevailing grid frequency. When the dchp is operated in so-called grid independent mode (where electricity is being generated only by an alternator connected to the engine), the frequency variation may be greater than this although measures are normally taken to regulate the nominal 50 Hz alternator output.

Where the actual operating frequency is close to or at the nominal (rated) operating frequency, the output 115 of the accelerometer may provide an output directly that is a sufficiently accurate indication of stroke length without correction. A larger variation in operating frequency could however render the stroke length predictions unreliable, so a frequency correction (determined, for example, from a look-up table which has been calibrated in advance) allows the derivation of a fully reliable confirmation of impending overstroke.

This measure of casing acceleration (frequency corrected where necessary or appropriate) has been found to give a reliable indication of the piston stroke length inside the engine.

Corrective Actions:

When the engine 1 is indicated as operating unstably and the piston is seen to be approaching overstroke, i.e. where collisions are possible, the controller 100 implements a schedule of corrective action. As changes in operating conditions can occur very quickly it is desirable that these actions match the indicated risk, and that any increasing risk is acted on within the space of a few stroke lengths (ms timespans).

Depending on the degree of indicated potential damage risk, the controller 100 can:

1. Low risk: reduce the output of the engine burner 2 to prevent impending collisions. A turn-down in the burner firing rate may take several seconds to feed through to the piston stroke length so it may be necessary to make a significant turn-down followed by a gradual increase to avoid unnecessary power reductions. This modulation process could be repeated until the risk of overstroke was reduced.

As an alternative in an intermediate risk situation, in is possible to switch in a variable stall resistor across the alternator of the dchp unit to slow the dchp engine without shut down. This allows the burner to be reduced so as to compensate more slowly.

2. Increasing risk: where the risk of collisions increase rapidly it may be necessary to shut down the engine burner 2 altogether or even switch the alternator circuit (not shown) across a "stop" resistor (also not shown), causing an immediate stop. Due to the time required for a safe restart (the burner 2 must cool to below a threshold temperature to prevent pre-ignition before a combustible mixture can be readmitted and relight initiated), this is only actioned where absolutely necessary.

By combining analysis of the FFT plot of alternator current 7 with the signal 115 from the sensor 110, a novel 2-stage overstroke/instability detection system 50 can therefore be provided. The FFT plot gives an early warning of developing instabilities so that the sensor output, particularly in the case of an analogue output from the optical sensor (FIGS. 4 and 5), the mechanical plunger (FIGS. 6 and 7) or the accelerometer (FIG. 2), can be more closely monitored. The instabilities may correct within a short time-span, either with or without the need for corrective action, and a shut-down may not be required. Alternatively where required, an engine shut-down can then be signalled with a greater degree of reliability than is possible with the current design, or with either method (optical/mechanical sensor or FFT plot) used alone.

The invention claimed is:

1. A domestic combined heat and power, dchp, unit comprising a Stirling engine having an engine head and a burner to input heat energy into the engine head to drive a reciprocating member;
   a combustible fuel supply;
   a generator for producing an electrical power output; and
   an instability detection apparatus for detecting instabilities of the Stirling engine, the apparatus being arranged to receive a signal from the generator to carry out a Fourier Transform on that signal, to monitor the Fourier Transform so as to identify the presence of artefacts within the Fourier Transform which are indicative of existing or developing instabilities within the engine, and in response to the identified presence of artifacts, to implement action on the Stirling engine to correct the instabilities.

2. The dchp unit of claim 1, wherein the instability detection apparatus is further arranged to receive a current signal from the generator, and to carry out a Fourier Transform of that current signal.

3. The dchp unit of claim 1, wherein the instability detection apparatus is further configured to identify the present of non-resonant harmonic frequencies in the Fourier Transform.

4. The of claim 1, wherein the instability detection apparatus is further arranged to monitor the Fourier Transform so as to identify a change in the number, and/or magnitude of the said artefacts within the Fourier Transform over time.

5. The dchp unit of claim 1, further comprising a heat output.

6. The dchp unit of claim 5, wherein the generator further comprises an alternator driven by the reciprocating member.

7. The dchp unit as claimed in claim 5, further comprising a controller arranged to receive an output from the instability detection apparatus indicative of the presence of the said artefacts in the Fourier Transform, the controller being configured to control the dchp unit to reduce the presence of instabilities when the said output of the apparatus indicates the presence of the artefacts in the Fourier Transform.

8. The dchp unit as claimed in claim 7, in which the controller is arranged to adjust the burner so as in turn to control the heat energy into the Stirling engine when the output received from the instability detection apparatus indicates the presence of artefacts in the Fourier Transform.

9. The dchp unit according to claim 1, further comprising:
a stroke length detector arranged to provide a stroke length detection output; and
a system controller arranged to receive as a first input from the instability detection apparatus, an indication of the presence of artefacts in the Fourier Transform of the generator electrical power output, to receive as a second input from the stroke length indicator the said stroke length detection output; and to control the Stirling engine so as to reduce the stroke length of the reciprocating member in dependence upon the first input thereto, the second input thereto, or both.

10. The dchp unit of claim 9, wherein the system controller is further arranged to control the burner so as to reduce the input heat energy to the engine head, whereby to reduce the stroke length of the reciprocating member, in dependence upon the said first and/or second inputs to the system controller.

11. The dchp unit of claim 9, wherein the system controller is further arranged to control the Stirling engine so as to stop the reciprocating member, in dependence upon the said first and/or second inputs to the system controller.

12. The dchp unit of claim 9, wherein the stroke length detector includes a switch operable when the reciprocating member approaches or exceeds an overstroke condition, to provide a stroke length detection output.

13. The dchp unit of claim 12, wherein the optical switch comprises means for generating a light beam, a means for receiving the light beam, the optical switch being arranged to provide the said stroke length detection output when a component that reciprocates directly or indirectly with the reciprocating member cuts the said light beam of the optical switch as a consequence of an approaching or exceeded overstroke condition.

14. A method of detecting instabilities of a Stirling engine of a domestic combined heat and power dchp unit, the dchp unit having a combustible fuel supply, being capable of generating a heat output, and having a generator for producing an electrical power output, the Stirling engine having an engine head and a burner to input heat energy into the engine head to drive a reciprocating member, the method comprising:
receiving a signal from the generator of the dchp unit;
carrying out a Fourier Transform on that signal;
monitoring the Fourier Transform so as to identify the presence of artefacts within the Fourier Transform which are indicative of existing or developing instabilities in the Stirling engine; and
responding to the identified presence of artefacts by implementing action on the Stirling engine to correct the instabilities.

15. The method of claim 14, wherein the step of receiving a signal from the generator comprises receiving a current signal therefrom.

16. The method of claim 14, wherein the step of monitoring the Fourier Transform comprises identifying non-resonant, harmonic peaks within the Fourier Transform.

17. The method of claim 14, further comprising monitoring the Fourier Transform of the generator signal, over a period of time; and
identifying an increase in the number and/or amplitude of artefacts in the Fourier Transform over that time period, indicative of an increase in the instabilities in the dchp.

18. An instability detection apparatus for detecting instabilities within an engine of a domestic combined heat and power, dchp, unit, the dchp unit having a combustible fuel supply and a generator for producing an electrical power output, the apparatus being arranged to receive a signal from the generator of the dchp, to carry out a Fourier Transform on that signal, and to monitor the Fourier Transform so as to identify the presence of artefacts within the Fourier Transform which are indicative of existing or developing instabilities within the dchp unit, the instability detection apparatus further comprising:
a dchp unit having:
an engine with a reciprocating member;
a combustible fuel supply;
a heat output; and
a generator for generating an electrical power output;
a stroke length detector arranged to provide a stroke length detection output; and
a system controller arranged to receive as a first input from the instability detection apparatus, an indication of the presence of artefacts in the Fourier Transform of the generator output, to receive as a second input from the stroke length indicator the said stroke length detection output; and to control the dchp unit so as to reduce the stroke length of the reciprocating member in dependence upon the first input thereto, the second input thereto, or both.

19. The apparatus of claim 18, wherein the engine of the dchp unit further comprises a burner to input heat energy into the engine head to drive the reciprocating member, the system controller being arranged to control the burner so as to reduce the input heat energy to the engine head, whereby to reduce the stroke length of the reciprocating member, in dependence upon the said first and/or second inputs to the system controller.

20. The apparatus of claim 18, wherein the system controller is arranged to control the engine.

21. The apparatus of claim 18, wherein the stroke length detector includes a switch operable when the reciprocating member approaches or exceeds an overstroke condition, to provide a stroke length detection output.

22. The apparatus of claim 21, wherein the switch is an optical switch comprising means for generating a light beam, a means for receiving the light beam, the optical switch being arranged to provide the said stroke length detection output when a component that reciprocates directly or indirectly with the reciprocating member cuts the said light beam of the optical switch as a consequence of an approaching or exceeded overstroke condition.

23. An instability detection apparatus for detecting instabilities within an engine of a domestic combined heat and power unit, the dchp unit having a combustible fuel supply and a generator for producing an electrical power output, the apparatus being arranged to receive a signal from the generator of the dchp, to carry out a Fourier Transform on that signal, and to monitor the Fourier Transform so as to identify the presence of artefacts within the Fourier Transform which are indicative of existing or developing instabilities within the dchp unit, the instability detection apparatus further comprising:

a dchp unit having a combustible fuel supply;

a generator for producing an electrical power output;

a heat output; and a controller arranged to receive an output from the instability detection apparatus indicative of the presence of the said artefacts in the Fourier Transform, the controller being configured to control the dchp engine to reduce the presence of instabilities when the said output of the apparatus indicates the presence of the artefacts in the Fourier Transform.

24. The apparatus of claim 23, wherein the engine is a Stirling engine having a burner to input heat energy into the engine head to drive a reciprocating member and the generator further comprises an alternator driven by the said reciprocating member, and further wherein the controller is arranged to adjust the burner so as in turn to control the heat energy into the Stirling engine when the output received from the instability detection apparatus indicates the presence of artefacts in the Fourier Transform.

* * * * *